_United States Patent_ [19]

Struck et al.

[11] Patent Number: 4,544,459
[45] Date of Patent: Oct. 1, 1985

[54] PROCESS FOR OBTAINING HYDROGEN AND OXYGEN FROM WATER

[75] Inventors: Bernd-Dieter Struck, Langerwehe; Bernd Biallas, Aachen; Rudolf Schulten, Aachen-Richterich, all of Fed. Rep. of Germany

[73] Assignee: Gesellschaft mit Beschränkter Haftung Kernforschungsanlage Jülich, Jülich, Fed. Rep. of Germany

[21] Appl. No.: 629,706

[22] Filed: Jul. 11, 1984

[30] Foreign Application Priority Data

Jul. 11, 1983 [DE] Fed. Rep. of Germany ... 332494584

[51] Int. Cl.$^4$ .......................... C25B 1/22; C25B 1/24; C25B 1/02
[52] U.S. Cl. .................................. 204/103; 204/129; 423/488; 423/507; 423/644
[58] Field of Search ................ 204/129, 103; 423/644, 423/462, 481, 486, 488, 507

[56] References Cited

U.S. PATENT DOCUMENTS

| | | | |
|---|---|---|---|
| 4,032,415 | 6/1977 | Sanders | 204/103 |
| 4,053,376 | 10/1977 | Carlin | 204/103 |
| 4,203,813 | 5/1980 | Grantham | 204/129 |
| 4,304,643 | 12/1981 | Diviser et al. | 204/129 |

OTHER PUBLICATIONS

Biallas, et al., "The Methane-Methanol Hybrid Cycle", Proceedings of the 4th World Hydrogen Energy Conference, California, USA, 13–17th Jun., 1982, vol. 2, pp. 579 et seq.
O'Keefe, et al., "Preliminary Results from Bench-Scale Testing of a Sulfur-Iodine Thermochemical Water-Splitting Cycle", Int. Journal of Hydrogen, vol. 7, No. 5, pp. 381 et seq.

Primary Examiner—R. L. Andrews
Attorney, Agent, or Firm—Nils H. Ljungman

[57] ABSTRACT

A process for obtaining hydrogen and oxygen from water in a two stage process including a first electrolysis stage performed in a two chamber cell wherein the chambers are separated by a membrane. Iodine is introduced into the cathodic chamber and hydrogen iodide is formed therein. Oxygen is formed in the anodic chamber and is removed as a product. The membrane conducts hydrogen ions and prevents the passage of the products HI and oxygen. In a second phase, hydrogen iodide is separated and removed from the cathodic chamber and is thermally decomposed into hydrogen and iodine. The iodine is recycled to the cathodic chamber and the hydrogen is recovered as a product.

10 Claims, No Drawings

PROCESS FOR OBTAINING HYDROGEN AND OXYGEN FROM WATER

BACKGROUND OF THE INVENTION

1. Field of the Invention

This invention relates to a two stage process for the production of oxygen and hydrogen from water using electrolysis with added iodine in the first stage to produce hydrogen iodide which is thermally decomposed in the second stage without electrolysis.

2. Description of the Prior Art

The prior art discloses a three stage process for the production of hydrogen by the electrolysis of water by producing intermediate methyl iodide. A cyclic process for obtaining oxygen and hydrogen is disclosed in the "Proceedings of the 4th World Hydrogen Energy Conference", California, USA, June 13–17, 1982, vol. 2, pages 579 et seg., the process being such that oxygen is produced electrolytically in the anode space and methyl iodide is produced in the cathode space. Then the methyl iodide is thermally decomposed with the addition of water and iodine to produce methane, methanol and iodine. The methane can be further decomposed in a steam reformer to produce carbon monoxide and hydrogen. However, the requirement of three stages is an unattractive feature of this prior art process.

The decomposition of $HI_x$ to hydrogen and iodine is known. This decomposition, for example, constitutes a step in the "sulfur-iodine" process of General Atomic (D. O'Keefe et al. "Preliminary results from Bench-Scale Testing of a Sulfur-Iodine Thermochemical Water-splitting Cycle", Int. Journal of Hydrogen Energy, vol. 7, No. 5, pages 381 et seq.). In this process, the $HI_x$ is freed of iodine, dried and conveyed to a decomposer in which the decomposition of hydrogen iodide into hydrogen and iodine takes place.

SUMMARY OF THE INVENTION

In spite of the prior art use of iodine in processes to produce hydrogen and oxygen either by electrolysis in presence of iodine and methanol producing $CH_3I$ with subsequent complicated decomposition of $CH_3I$ or by chemically producing HI and sulfuric acid starting with $I_2$, $SO_2$, $H_2O$ by the Bunsen reaction with subsequent separations and decomposition of the acids especially HI, there remains a need for a more efficient process for utilizing iodine for producing hydrogen and oxygen in a hybrid process, using electrolysis only in part.

This invention concern a hybrid process for obtaining hydrogen and oxygen from water in a cyclic operation wherein oxygen is produced anodically and hydrogen iodide is produced cathodically in a first stage by electrolysis and in a second stage without electrolysis the hydrogen iodide is thermally decomposed to hydrogen and iodine with the iodine being recycled and the hydrogen being recovered.

This invention further teaches the provision of a membrane for the electrolysis process to separate an anodic chamber from a cathodic chamber and to keep oxygen formed at the anode from reaching the cathodic chamber as well as HI formed at the cathode from reaching the anodic chamber.

The invention further teaches the use of a suspension acid or solution aid for the iodine in the cathodic chamber which helps to enhance the iodine concentration and to favour the electrolyticproduction of HI or additionally to separate out an $HI_x$-containing phase.

It is therefore, an object of this invention to provide a hybrid cyclic process for obtaining hydrogen and oxygen by an electrolysis stage and a second thermal decomposition stage.

It is a further object of this invention to provide a process in which cathodic hydrogen iodide is formed, especially in the form of $HI_x$.

It is another object of this invention to provide a process wherein it is also easily possible, if desired, to extract HI from the electrolyte in the form of an $HI_x$-containing phase from which the HI can be separated by distillation and finally decomposed thermally.

DESCRIPTION OF THE PREFERRED EMBODIMENTS

By comparison with the decomposition of water itself, a lower decomposition voltage is required for the electrolytic formation of oxygen and hydrogen iodide in accordance with the following equation:

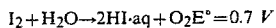

$$I_2 + H_2O \rightarrow 2HI \cdot aq + O_2 \quad E^\circ = 0.7 \, V$$

Because hydrogen iodide is susceptible to oxidation, the electrolysis should be carried out in a two-chamber cell whose cathode space is protected from attack by the anodically formed oxygen. Advantageously, use is made of a cation exchange membrane which allows the passage of hydrogen ions and which is preferably directly coated with an electrode material on the cathodic side.

Iodine is introduced into the cathode chamber. The concentration of the iodine can be increased by means of solution aids such as organic solvents including acetonitrile, ethylene glycol, dimethyl ether and/or by the presence of activated carbon or an iodide.

Preferably, the electrolyte is stirred or agitated or brought into contact with the cathode in a flow-through process in which the stream of electrolyte passes by the electrode. The cathode can be made in the form of a flow-through electrode as well.

Finally, excess iodine can be colloidally dissolved in the moving electrolyte.

The activated carbon (or material analogous to activated carbon) provided at the cathode to increase the adsorption of iodine, and hence promote the formation of hydrogen iodide at the cathode, can be applied to a graphite cathode with the aid of a binder or by coking an organic substance. However, electrically conducting carbon with good absorption properties can be applied to the cathode.

The electrolytic cell can be a two-chamber electrolysis cell with a cation exchange membrane which serves as a separator to prevent the iodide from passing over into the anode space and oxygen from passing over into the cathode space thus preventing iodide oxidation and oxygen reduction. As mentioned above, this cation exchange membrance can be coated with electrode material at the cathodic side. The same can be applied to the anode side.

An aqueous acid electrolyte from which oxygen can be anodically liberated serves as the electrolyte in the anode chamber. The catholyte, in which iodine can be dissolved or suspended, can likewise consist of an aqueous acid electrolyte such as, for example, aqueous solutions of $H_2SO_4$ or $H_3PO_4$, or it can consist of HI or an aqueous acid electrolyte with a solution aid for iodine.

In the event that the cathode is applied in the form of a permeable or porous layer on the cation exchange separator, use can also be made in the cathode space of an iodine solution having a lower electrical conductivity, if need be in an organic solvent.

In the event that use is made of a flow-through electrode, a porous active carbon/graphite body is introduced into the cathode space.

Oxygen, which is drawn-off from the anode space, constitutes the anodic product of the electrolysis. HI is formed at the cathode from iodine dissolved in the catholyte and may be separated simply, by distillation or extraction. In the presence of excess iodine and organic solvent HI separates from the catholyte in form of a heavy $HI_x$-containing phase which is insoluble in sulfuric acid separates out along with some water and organic solvent from the remaining electrolyte, and thus can be drawn-off very easily. An electrolyte with excess (suspended) iodine was found to be cathodically preferable, the said electrolyte containing methanol and 30 to 40% sulfuric acid in the volume ratio 1:1 to 1:10 and being held in motion to attain higher current densities.

Instead of methanol, use can be made of any other suitable solvent which can be used as a solution aid for iodine in the acid electrolyte, the said solvent making possible the separation of the HI-containing phase and being appropriately stable. Especially stable is acetonitrile, whose presence in the electrolyte, with increasing formation of HI, causes precipiation of an HI-containing phase with the composition $HI:I_2:H_2O:CH_3CN = 2:2.13:0.88:5.51$. Ethylene glycol dimethyl ether (EGDE) is another usable solvent. In this case, the phase which separates-out during the electrolysis has the composition $HI:I_2H_2O:EGDE = 2:6.29:2.4:5.43$. With methanol an insoluble phase is obtained having the composition $2HI \cdot 4.74I_2 \cdot 1.69 H_2O \cdot 6.07CH_3OH$.

The quantity ratio of organic solvent to aqueous acid is relatively uncritical and depends on the electrical conductivity of the mixed electrolyte (which drops with increasing fraction of organic solvent) and on the current density attainable in the electrolysis (which increases with increasing iodine concentration in the electrolyte resulting from the increasing fraction of organic solvent). Usually, mixture ratios of organic solvent to aqueous acid of about 1:1 (V/V) will be satisfactory.

Since the decomposition of hydrogen iodide into hydrogen and iodine is known, the following examples concern mainly the electrolysis step.

EXAMPLE 1

The cathodic reduction of iodine was investigated using a porous graphite electrode coated with activated carbon. The electrode functioned as a flow-through electrode with the flow directed from the front surface to the rear surface. The solubility of the iodine was increased by the addition of potassium iodide to the catholyte.

The experimental data were as follows:
Form of cathode: Disc (plate) of surface area 5 $cm^2$ and thickness 0.6 cm.
Porosity of cathode: 50%
Flow-rate of catholyte: 1 liter/min
Catholyte: 30 wt. % $H_2SO_4$ + 2.5 wt. % $I_2$ + 3 wt. % KI.
Reference electrode: Dynamic hydrogen electrode in 30% by weight $H_2SO_4$
Temperature: 85° C.
Pressure: 1 bar
Investigational method: galvanostatic.

As an experimental result obtained for the cathodic reduction of iodine at a current density of 50 mA/$cm^2$, the cathode potential was +380 mV measured against the dynamic hydrogen electrode and, at 100 mA/$cm^2$, the cathode potential was +300 mV.

The investigation of the cathode was effected in a two chamber electrolysis cell made of PVCHT (modified polyvinyl chloride). The cathode and anode chambers were separated by a cation exchange membrane of the NEOSEPTA ®C 66-5 T type. The anolyte consisted of 30 wt. % $H_2SO_4$ and the oxygen-developing anode consisted of platinized platinum.

The cell voltage at 50 mA/$cm^2$ was 1490 V and at 100 mA/$cm^2$ it was 1700 mV. These relatively high cell voltages were essentially due to the high ohmic resistance of almost 2 ohm.$cm^2$ of the laboratory cell employed and to the non-optimized anode. Measured against the dynamic hydrogen electrode, the anode potential at 50 mA/$cm^2$ had a value of 1780 mV and, at 100 mA/$cm^2$, a value of 1830 mV.

P. Cavallotti et al. (in: "Hydrogen as an energy vector" ed. by A. A. Strub and G. Imarisio, EUR 6783, D. Reidel Publishing Co., Boston, 1980, p. 420) obtained 1550 mV against the dynamic hydrogen electrode in approximately 10 wt. % $H_2SO_4$ at 65° C. with $RuO_2$-catalyzed anodes. If this value for the anode potential is taken into account and if, in addition, account is taken of the technologically possible reduction of the cell's ohmic resistance to 0.5 ohm.$cm^2$, there is obtained a practically attainable cell voltage of 1300 mV at 100 mA/$cm^2$.

EXAMPLE 2

The electrochemical cell consisted of two half-cells separated by an $H^+$-permeable membrane (cation exchange membrane of the Nafion ®415 type). The cathode and anode were made of platinum. As the electrolyte, use was made of 30 wt. % sulfuric acid to which was cathodically added 35 vol. % of acetonitrile along with 1.2 mol/liter of iodine. The electrolysis was carried out at ambient temperature 500 mV below the potential at which hydrogen is developed (cell voltage about 1 V). The electrolyte was kept in continous motion. Current densities of about 100 mA/$cm^2$ were measured. The HI which formed collected at the bottom of the cell as an $HI_x$ phase having the composition $2 HI \cdot 2.13I_2 \cdot 0.88H_2O \cdot 5.51CH_3CN$ and could be drawn off continuously. Acetonitrile and iodine were added to the electrolyte as required. Volatile fractions (of $CH_3CN$, $H_2O$ and $I_2$) were distilled-off from the separated $HI_x$ phase by treating with approximately 100% phosphoric acid with the production of HI which would be thermally cracked (decomposed) at 400° C.

EXAMPLE 3

The cathodic reduction of iodine was investigated with and without the addition of active carbon powder in the acid electrolyte.

The experimental setup employed and the test conditions chosen served to provide a relative measurement and were not optimized under load conditions.

The electrochemical laboratory cell was made of glass. The catholyte was agitated with a magnetic stirrer. Serving as the cathode was a rectangular sheet of platinum of 2 cm$^2$. The temperature was 60° C. The reference electrode was a dynamic hydrogen electrode in 1 wt. % $H_2SO_4$. The investigation was carried out with the addition of iodine and active carbon powder in 300 ml of 1 wt. % $H_2SO_4$ (volume measured at 25° C.).

Cyclic voltammetry served as the electrochemical method of investigation. The scan rate was 1 V/s in the potential range between 0 and 700 mV against the dynamic hydrogen electrode. The values obtained in the forward scan (sweep) and return scan of the delta voltage diagram are in agreement for the given current densities.

Initially, 9 g of $I_2$ was added to the catholyte. This resulted in an $I_2$-saturated solution. The current density, measured at the cathode in the potential region of the occurring limiting diffusion current, was 5 mA/cm$^2$ between 0 and +650 mV against the dynamic hydrogen electrode.

On the other hand, by adding 30 g of active carbon powder (manufactured by Merck) and an additional 18 g of $I_2$, increased current densities were measured while constantly stirring. In the range of potential investigated, no limiting (boundary) current was observed. The measured current densities had the following values:

| Potential vs the dynamic hydrogen electrode, mV | Current density mA/cm$^2$ |
| --- | --- |
| 0 | 36 |
| +200 | 27 |
| +300 | 23 |
| +400 | 18 |
| +600 | 8 |
| +650 | 5. |

We claim:

1. A two-stage hybrid process for obtaining hydrogen and oxygen from water by partly using electrolysis and using iodine recycled in the process which comprises using a two-chamber cell with an intermediate membrane separating the two chambers, the process including: electrolyzing in a first electrolysis state using an anodic chamber and a cathodic chamber separated by a membrane that conducts hydrogen ions, adding iodine to said cathodic chamber, forming oxygen in said anodic chamber, forming cathodic hydrogen iodide in said cathodic chamber, separating and extracting a hydrogen iodide-containing phase from said cathodic chamber and passing said hydrogen iodide without electrolysis to a second stage and thermally decomposing hydrogen iodide into hydrogen and iodine and recycling said iodine to said cathodic chamber.

2. The process of claim 1 including the step of using a cathodic electrolyte wherein the cathodic electrolyte includes carbon powder.

3. The process of claim 1 including the step of adding iodide to a cathodic electrolyte as a solution aid.

4. The process of claim 1 wherein a cathodic electrolyte contains iodide and an organic solvent for iodine, wherein the step of separating hydrogen iodide comprises separating a heavy $HI_x$-containing phase from the cathodic chamber.

5. The process of claim 1 wherein a cathodic electrolyte contains aqueous sulphuric acid, acetonitrile and suspended iodine, wherein the step of separating hydrogen iodide comprises separating a heavy $HI_x$-containing phase from the cathodic chamber.

6. The process of claim 1 wherein the step of separating and extracting hydrogen iodide comprises extracting hydrogen iodide from the electrolyte in the form of $HI_x$ and drying the $HI_x$ and then thermally decomposing the $HI_x$ into hydrogen and iodine.

7. The process of claim 1 wherein the cathode contains an activated carbon.

8. The process of claim 1 wherein the cathodic chamber is separated by a cation exchange membrane which is coated with an electrode material at the cathodic side.

9. The process of claim 8 wherein the electrode coating is permeable and contains activated carbon.

10. The process of claim 1 wherein the cathodic chamber is separated by a cation exchange membrance which is coated with an electrode material at the anodic side.

* * * * *

UNITED STATES PATENT AND TRADEMARK OFFICE
CERTIFICATE OF CORRECTION

PATENT NO. : 4,544,459
DATED : October 1, 1985
INVENTOR(S) : Bernd-Dieter Struck et al It is certified that error appears in the above-identified patent and that said Letters Patent is hereby corrected as shown below:

On the title page assignee should read:

-- Assignee: Kernforschungsanlage Jülich Gesellschaft mit Beschränkter Haftung, Fed. Rep. of Germany --.

Signed and Sealed this

Tenth Day of December 1985

[SEAL]

Attest:

DONALD J. QUIGG

Attesting Officer    Commissioner of Patents and Trademarks